United States Patent [19]
Takahashi

[11] Patent Number: 5,878,185
[45] Date of Patent: Mar. 2, 1999

[54] APPARATUS FOR RECORDING/ REPRODUCING A VIDEO SIGNAL USING A ROTARY HEAD

[75] Inventor: Koji Takahashi, Kanagawa-ken, Japan

[73] Assignee: Canon Kabushiki Kaisha, Tokyo, Japan

[21] Appl. No.: 382,538

[22] Filed: Feb. 2, 1995

Related U.S. Application Data

[62] Division of Ser. No. 223,309, Apr. 5, 1994, Pat. No. 5,392,164, which is a continuation of Ser. No. 704,261, May 22, 1991, abandoned.

[30] Foreign Application Priority Data

| May 30, 1990 | [JP] | Japan | ................................... 2-142893 |
| May 25, 1990 | [JP] | Japan | ................................... 2-135580 |
| Jun. 4, 1990 | [JP] | Japan | ................................... 2-146437 |
| Jun. 6, 1990 | [JP] | Japan | ................................... 2-148972 |

[51] Int. Cl.$^6$ .................................................. H04N 5/91
[52] U.S. Cl. ............................. 386/74; 386/80; 386/109; 360/15
[58] Field of Search ............................... 360/8, 9.1, 10.1, 360/10.2, 10.3, 15, 70, 64; 358/335; 369/84; 386/52, 68, 74, 80, 109

[56] References Cited

U.S. PATENT DOCUMENTS 5,392,164  2/1995  Takahashi .............................. 360/15
5,495,369  2/1996  Rijckaert et al. ..................... 360/64 X

FOREIGN PATENT DOCUMENTS 63-49953  10/1988  Japan .

*Primary Examiner*—Andrew L. Sniezek
*Attorney, Agent, or Firm*—Robin, Blecker & Daley

[57] ABSTRACT

A dubbing system for duplicating a tape-shaped recording medium on which an amount of information signals for a given period of time are recorded in each of many tracks having different azimuth angles between adjacent tracks includes a reproducing apparatus wherein N rotary heads (N: an integer which is at least 2) which have different azimuth angles between adjacent heads and rotate in a closely adjacent state are used for reproducing, as N channel signals, information signals from N adjacent tracks formed on a first tape-shaped recording medium, and a recording apparatus wherein N rotary heads which have different azimuth angles between adjacent heads and rotate in a closely adjacent state are arranged to receive the reproduced N channel signals and to record them on a second tape-shaped recording medium while forming N adjacent tracks on the second tape-shaped recording medium.

25 Claims, 14 Drawing Sheets

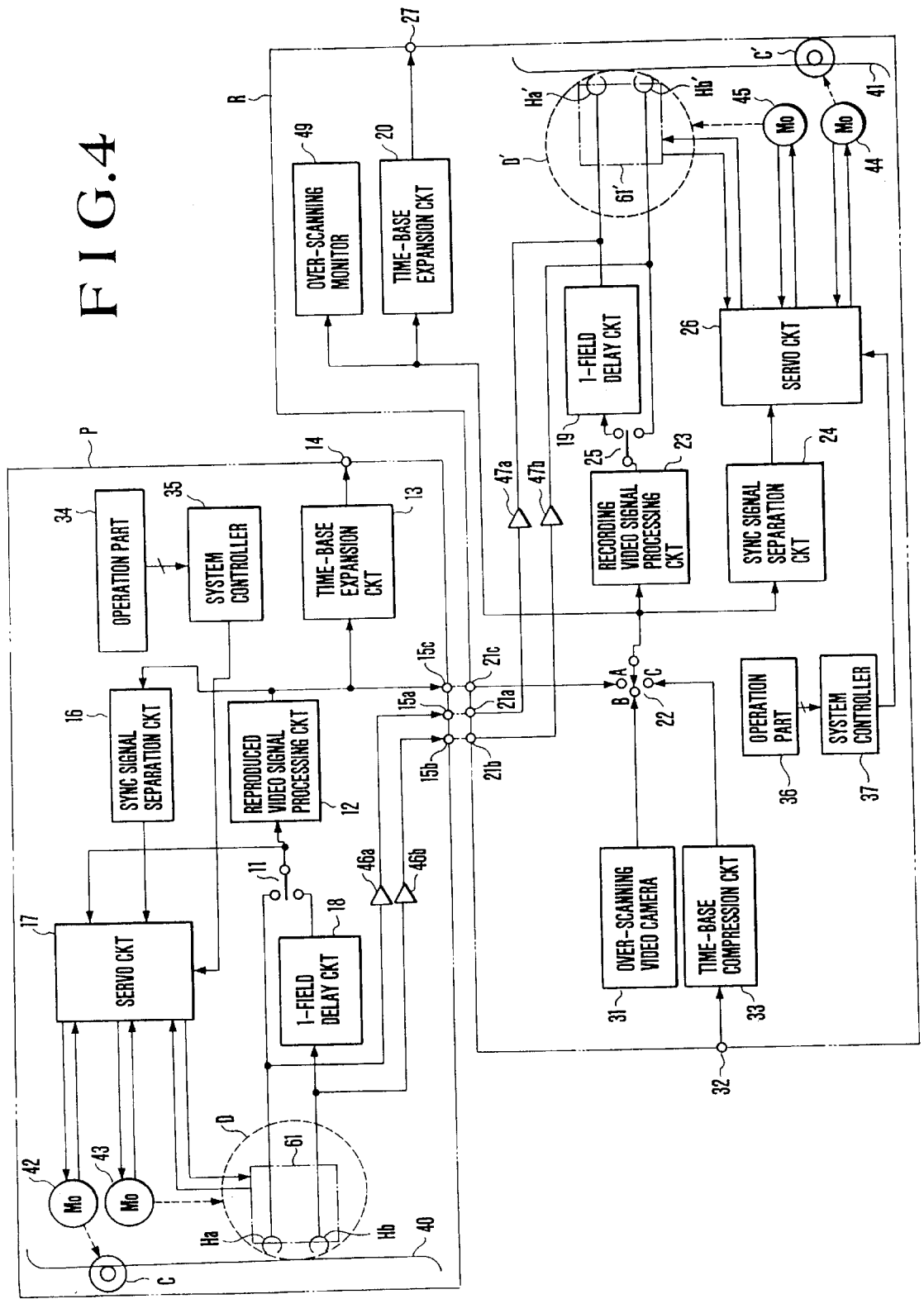

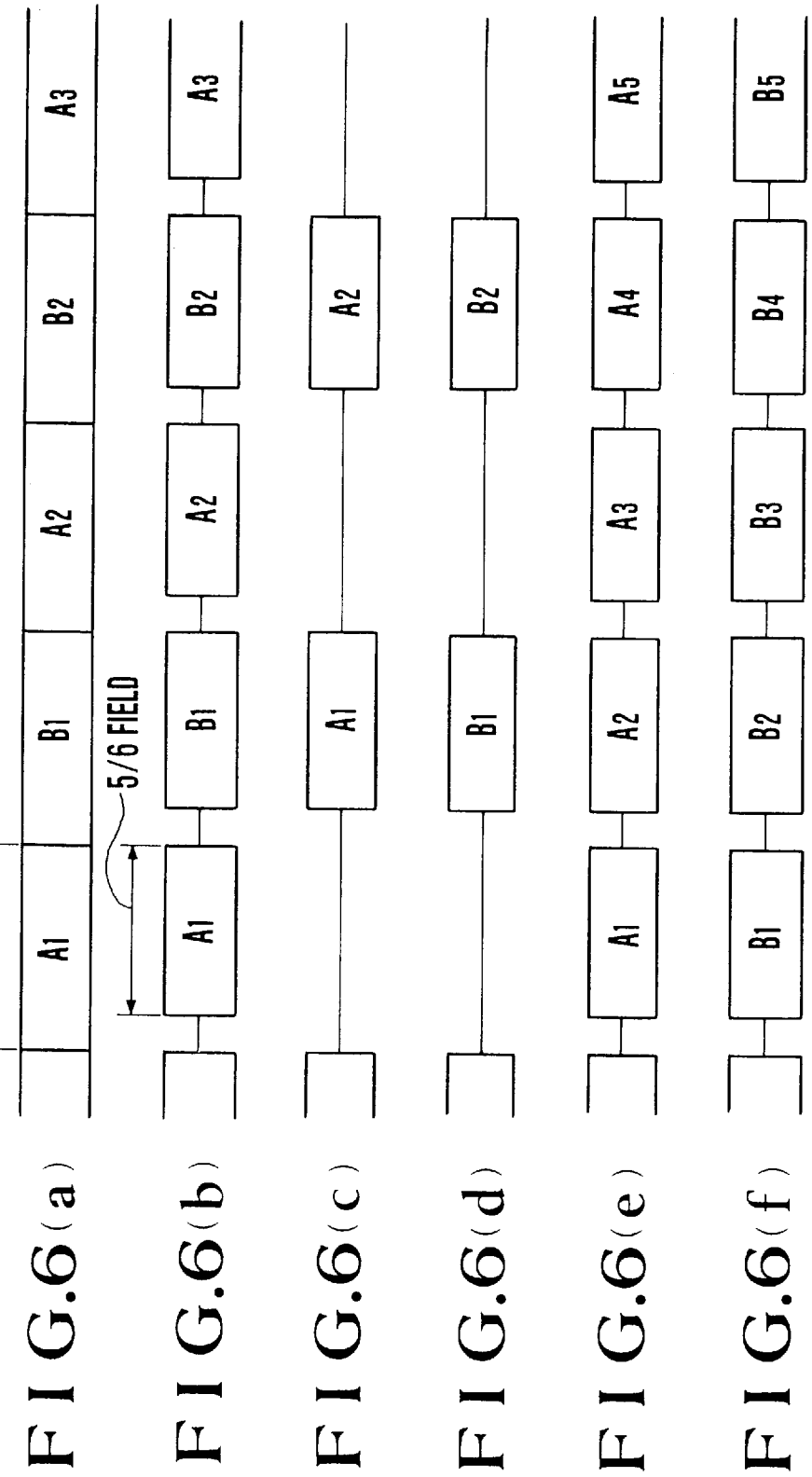

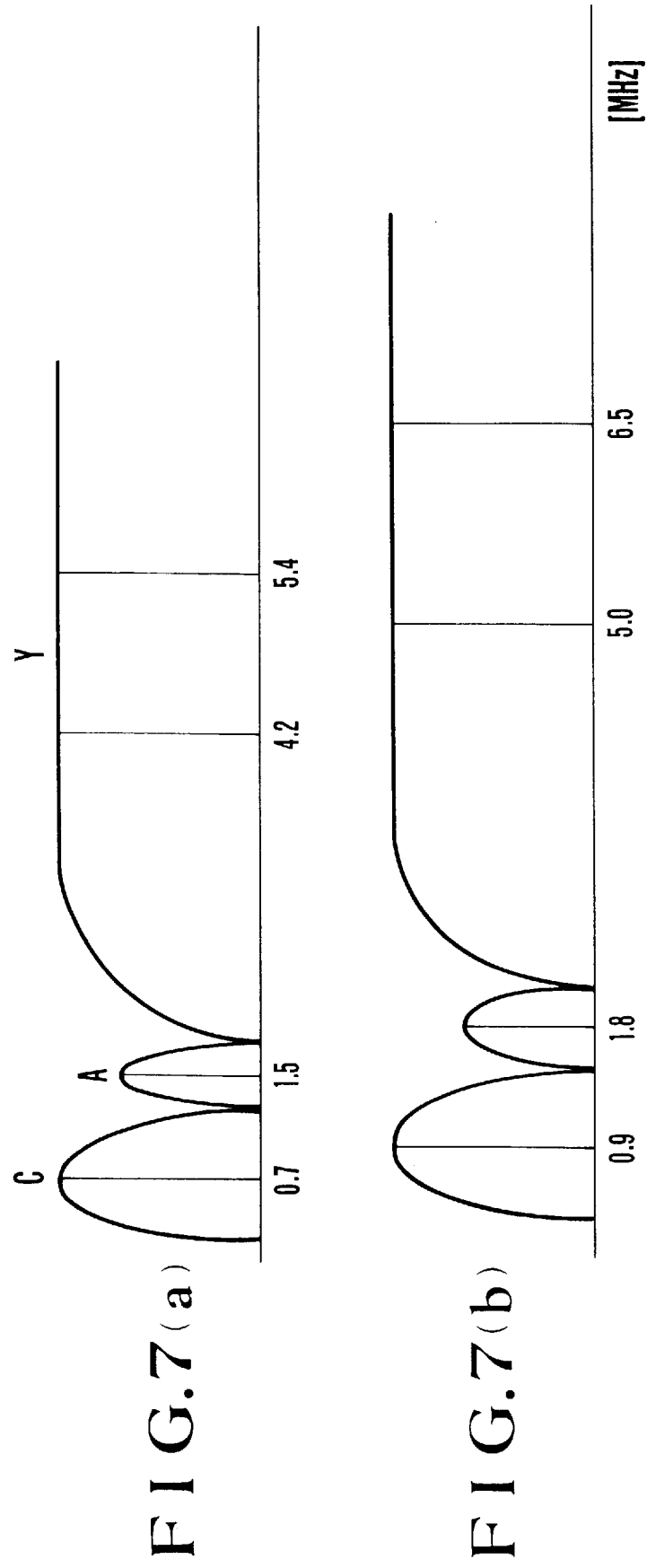

APPARATUS FOR RECORDING/ REPRODUCING A VIDEO SIGNAL USING A ROTARY HEAD

This application is a division, of application Ser. No. 08/223,309, filed Apr. 5, 1994 now U.S. Pat. No. 5,392,164, which is a continuation of application Ser. No. 07/704,261, filed May 22, 1991 and now abandoned.

BACKGROUND OF THE INVENTION

1. Field of the Invention:

This invention relates to a dubbing system and more particularly to a dubbing system for a tape-shaped recording medium on which an amount of information signals for a given period of time are recorded in each of many recording tracks which are formed to have different azimuth angles between adjacent tracks.

2. Description of the Related Art:

Apparatuses for recording and reproducing an amount of information signals for a given period of time on and from each of tracks formed on a tape-shaped recording medium include helical-scanning type home video tape recorders (hereinafter referred to as VTRs). The dubbing system of the kind using VTRs of this type is arranged as described below:

The home VTRs which are known in general are of the kind called a two-head helical scanning type. FIGS. 1(a) and 1(b) show the head arrangement generally employed for the VTR of this kind. In FIGS. 1(a) and 1(b), a reference numeral 1 denotes a magnetic tape. Tape guides 2a and 2b are provided for wrapping the tape 1 at least 180 degrees around the periphery of a rotary drum 3. Rotary heads HA and HB are mounted on the rotary drum 3 at the same height in the direction of the axis of rotation and, as shown, are arranged to have a phase difference of 180 degrees between them. The azimuth angle of one head differs from that of the other. As well known, these heads HA and HB are arranged to record and reproduce an amount of a video signal for one field while they rotate 180 degrees.

For the VTR of this kind, the length of track in which one field amount of video signal is to be recorded is specified as a standard. Accordingly, the diameter of the rotary drum 3 is determined by the specified length of track. This has prevented a desired reduction in size and weight of the VTR, because the drum 3 cannot be arranged to have a smaller diameter.

In view of this, VTRs which are arranged to permit a reduction in diameter of the drum have been proposed. The VTR of that kind is arranged as follows: FIGS. 2(a) and 2(b) show the head arrangement of the VTR of the kind using a small-diameter drum. Referring to these figures, rotary heads Ha and Hb have different azimuth angles from each other. They make one turn in the one-field period of a video signal. The heads Ha and Hb are arranged close to each other to rotate with the phase difference of a very small angle θ°. They are mounted on a rotary drum 4 at the same height in the direction of the axis of rotation.

A tape 1 is wrapped at least 300 degrees around the drum 4. One field amount of the video signal is recorded while the rotary heads Ha and Hb rotate 300 degrees respectively. In other words, this VTR is capable of recording one field amount of the video signal within a period shorter than the conventional one-field period of the video signal.

Therefore, assuming that the video signal to be recorded by the VTR of that kind is of the NTSC system, the video signal must have a vertical scanning frequency fv at 60 Hz and a horizontal scanning frequency fh at 18.9 (15.75×6/5) KHz instead of those frequencies fv and fh of the normal NTSC signal which are 60 Hz and 15.75 KHz. In other words, the video signal to be recorded by the VTR of that kind either must be time-base-compressed to 5/6 of the normal TV signal or must be obtained from a video camera specially designed for that VTR.

The above-stated special video camera scans a picture plane of an aspect ratio 9:10 as indicated by a broken line Y in FIG. 3 and produces a picture of an aspect ratio 3:4 as an effective picture plane as indicated by a full line X within a 5/6 field period. The heads Ha and Hb shown in FIGS. 2(a) and 2(b) are capable of forming one track within the 5/6 field period. Therefore, one field amount of the video signal can be recorded in each track, so that the video signal is recordable by the same format as the VTR having the head arrangement as shown in FIGS. 1(a) and 1(b). In other words, with the VTR of the head arrangement as shown in FIGS. 2(a) and 2(b) arranged to record the above-stated video signal, the drum diameter can be reduced to 3/5 of that of the VTR of the head arrangement shown in FIGS. 1(a) and 1(b).

Further, an arrangement to time-base-expand a reproduced video signal to 6/5 of it per field enables the VTR of the head arrangement of FIGS. 2(a) and 2(b) to operate in the same manner as the VTR of the head arrangement shown in FIGS. 1(a) and 1(b).

Generally, a dubbing operation on a tape is performed with two VTR units. For example, in dubbing a two-hour amount of motion picture information, the standard TV signal is transferred for a period of two hours in real time. However, as a result of popularization of the camera-integrated VTRs, many people now wish to do editing and dubbing work in an easy and simple manner. The real-time dubbing is too troublesome for users who are accustomed to high-speed dubbing with audio tape recorders. For example, deletion of a very small part of a two-hour long motion picture necessitates much time and labor.

In dubbing with the VTR having the small drum as shown in FIGS. 2(a) and 2(b), the video signal which has been time-base-compressed to 5/6 per field is temporarily time-base-expanded to make it into the form of the standard TV signal. After that, the signal must be again time-base-compressed for every field. It thus has necessitated various processes for high-speed dubbing.

Further, in cases where the apparatus to be used for dubbing is of the kind called a four-frequency type, a tracking control circuit becomes complex and thus has hindered the realization of high-speed dubbing.

SUMMARY OF THE INVENTION

This invention is directed to a solution of the above-stated problems. It is, therefore, an object of the invention to provide a dubbing system which permits high-speed dubbing with a rotary-head type apparatus which is compact in size and simple in structural arrangement.

Under this object, a dubbing system which is arranged as an embodiment of the invention to duplicate a tape-shaped recording medium on which an amount of information signals for a given period of time are recorded in each of many tracks having different azimuth angles between adjacent tracks comprises:

a reproducing apparatus arranged to cause a first tape-shaped recording medium to travel to an extent corresponding to N tracks (N: an integer which is at least 2) per the given period of time and to reproduce, as N channel signals, information signals recorded in N adjacent tracks on the first tape-shaped recording medium by using N rotary heads which are arranged to have different azimuth angles between adjacent heads and to rotate in a closely adjacent state; and a recording apparatus arranged to cause a second tape-shaped recording medium to travel to an extent corresponding to N tracks per the given period of time and to record, while forming N adjacent tracks on the second tape-shaped recording medium, the reproduced N channel signals on the second recording medium by using N rotary heads which are arranged to have different azimuth angles between adjacent heads and to rotate in a closely adjacent state.

The above and other objects and features of the invention will become apparent from the following detailed description of embodiments thereof taken in connection with the accompanying drawings.

BRIEF DESCRIPTION OF THE DRAWINGS

FIG. 4 is a block diagram showing in outline the arrangement of a dubbing system arranged as an embodiment of this invention. FIGS. 6(a) to 6(f) show in a timing chart the signal processing timing of each part of the system of FIG. 4. FIGS. 7(a) and 7(b) show video signals to be handled by the system of FIG. 4.

DETAILED DESCRIPTION OF THE PREFERRED EMBODIMENTS

Figure 5A:
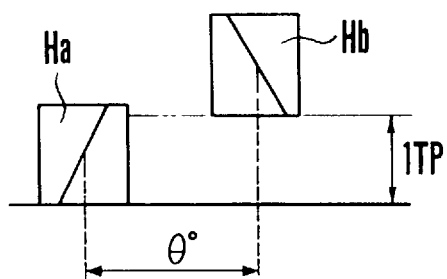
FIGS. 5(a) and 5(b) show the head arrangement of the VTR of the system shown in FIG. 4.
Figure 5B:
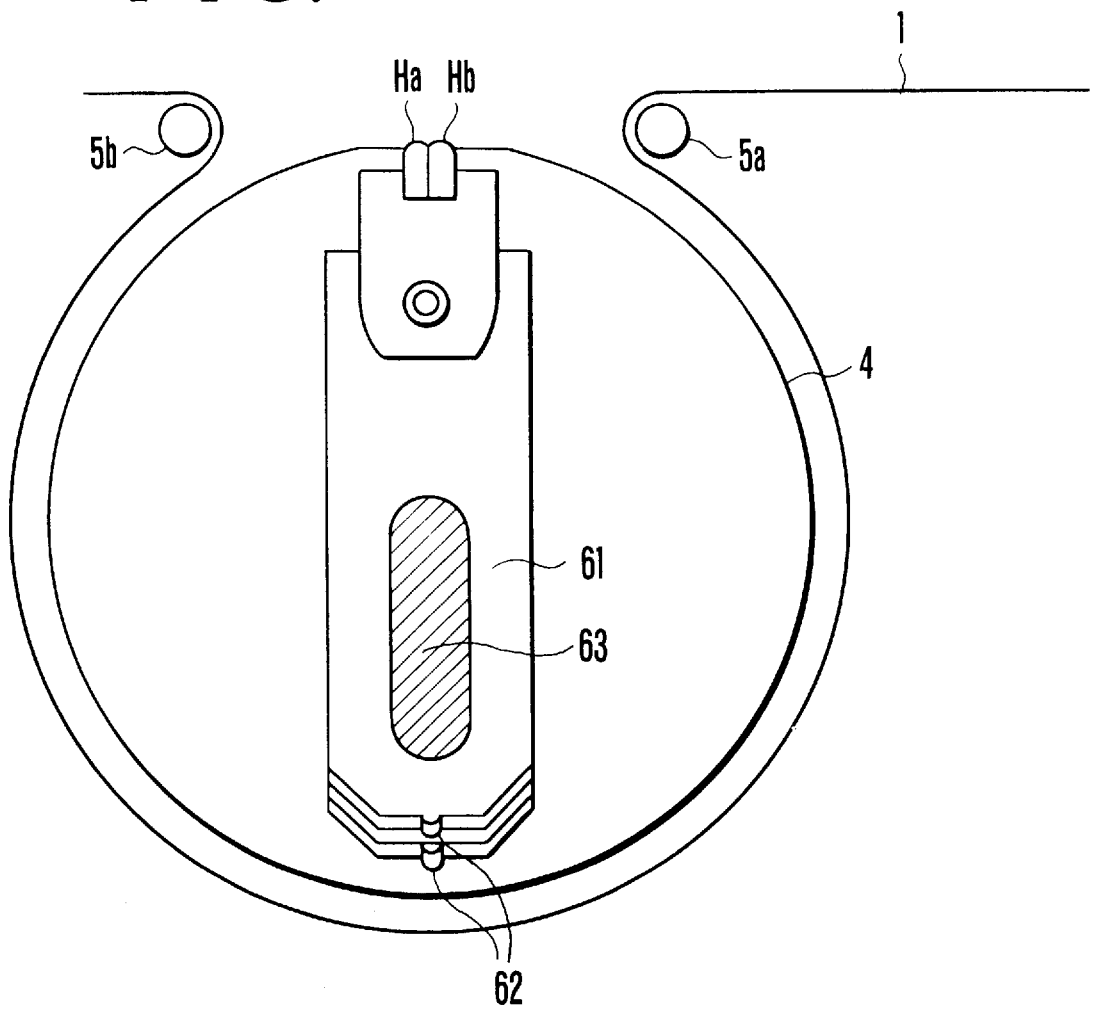

The following describes the details of dubbing systems arranged as embodiments of this invention:

FIG. 4 shows in outline the arrangement of a dubbing system arranged according to this invention as an embodiment thereof. FIGS. 5(a) and 5(b) show the head arrangement of each of reproducing-side and recording-side VTRs included in the system of FIG. 4.

Figure 2A:
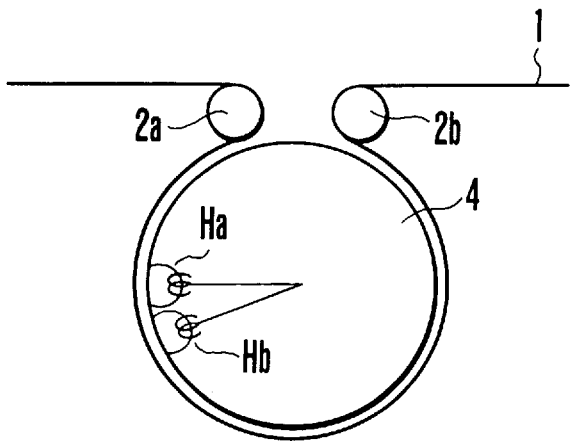
FIGS. 2(a) and 2(b) show the head arrangement of the conventional VTR of the kind using a compact drum.
Figure 2B:
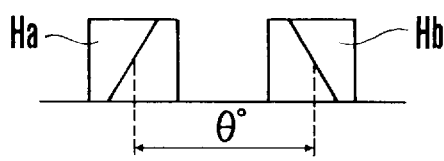
Figure 3:
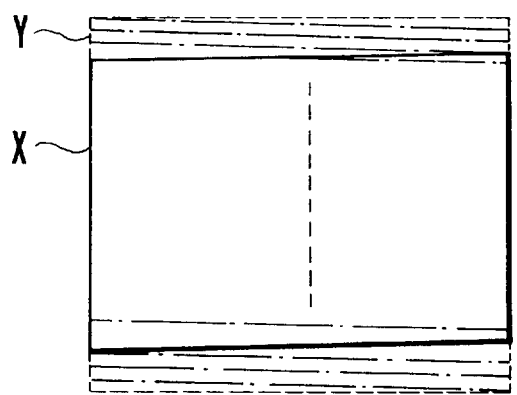
FIG. 3 shows the picture plane of a video camera specially adapted for the head arrangement of the VTR shown in FIGS. 2(a) and 2(b).

The head arrangement of the VTR on the reproduction side of the system of this embodiment and that of the recording side of the system differ from the head arrangement shown in FIGS. 2(a) and 2(b) in the following points: The positions of heads Ha and Hb are shifted relative to each other as much as one track pitch (1 TP) in the direction of the axis of rotation. In addition to this, these heads Ha and Hb are disposed on an electrostrictive element 61 which is arranged to displace these heads in the direction of the axis of rotation.

Referring to FIG. 4, a reference symbol P denotes the VTR disposed on the side of reproduction (hereinafter referred to as a reproducing-side VTR). A symbol R denotes the VTR disposed on the side of recording (hereinafter referred to as a recording-side VTR). For the sake of simplification of illustration, FIG. 4 shows only such parts that participate in reproduction and recording. Either of these VTRs may be arranged to perform a recording or a reproducing function. Magnetic tapes 40 and 41 have the same recording format as that of the VTR having the head arrangement shown in FIGS. 1(a) and 1(b).

The normal reproducing operation of the reproducing-side VTR P of FIG. 4 is first described as follows: When an instruction for normal reproduction is given from an operation part 34, a system controller 35 causes a servo circuit 17 to control a capstan motor 42. The tape 40 is then moved by a capstan C at a rate of one track per one field period. Meanwhile, the servo circuit 17 is caused by the system controller 35 to control a drum motor 43 to rotate a drum D one turn per one field period. As a result, the heads Ha and Hb come to serially trace tracks one after another respectively. In the period of one field during which the head Ha is tracing a track Ta which has an azimuth angle corresponding to the head Ha, the other head Hb traces a track Tb which has an azimuth angle corresponding to the head Hb. During this period, a reproduced signal can be taken out by the heads Ha and Hb. In a next one-field period ensuing on the above-stated period, the head Ha traces the track Tb while the head Hb traces the track Ta. During this ensuing period, no reproduced signal is obtained.

FIGS. 6(a) to 6(f) show in a timing chart the action of each part of the dubbing system of this embodiment. In these figures, reference symbols A1, B1, A2,—denote one-field amounts of a video signal. In the case of the VTR of the dubbing system of this embodiment, the video signal of the kind arranged as shown in FIG. 6(a) is reproduced as shown in FIGS. 6(c) and 6(d): Whereas, a VTR having heads arranged as shown in FIGS. 2(a) and 2(b) gives a reproduced video signal as shown in FIG. 6(b).

The signal reproduced by the head Hb is delayed one field period by a 1-filed delay circuit 18 to be supplied to a switch 11 together with the signal reproduced by the head Ha. The connecting position of the switch 11 is on the side of the head Ha for the one-field period during which the signal is reproducible by the heads Ha and Hb and is on the side of the delay circuit 18 for the next one-field period. As a result, the output of the switch 11 becomes a signal which is time-base-compressed simply to 5/6 of the signal of each field, as shown in FIG. 6(b).

Figure 1A:
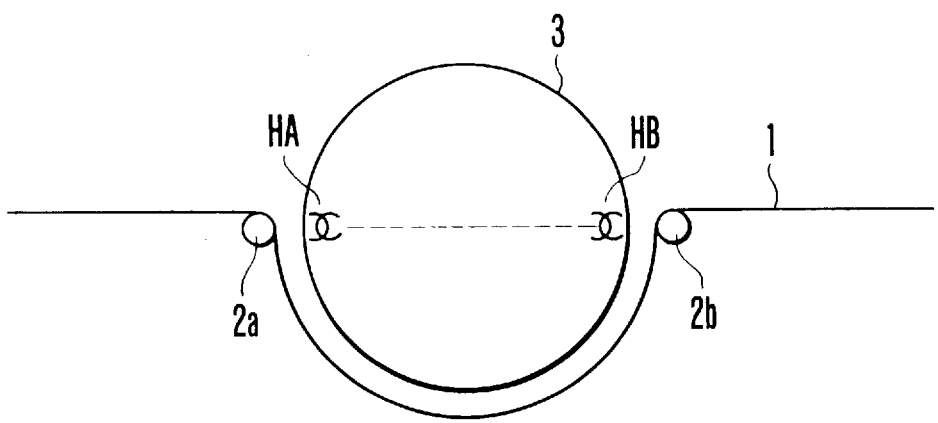
FIGS. 1(a) and 1(b) show the head arrangement generally employed for the conventional VTR.
Figure 1B:
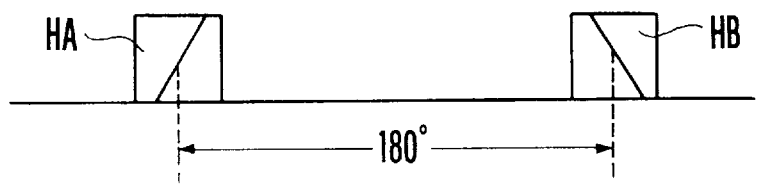

FIGS. 7(a) and 7(b) show the feature of signals reproduced by the VTR of the system of this embodiment. FIG. 7(a) shows the spectrum allocation of signals which are recorded and reproduced by the head arrangement of the prior art VTRs shown in FIGS. 1(a) and 1(b), and FIG. 7(b) shows that of signals recorded and reproduced by the VTRs of the system of this embodiment. In these figures, a reference symbol Y denotes a frequency-modulated luminance signal. A symbol A denotes a frequency-modulated audio signal. A symbol C denotes a low-band-converted chrominance signal.

As apparent from FIGS. 7(a) and 7(b), the frequency of the signal output from the switch 11 of this embodiment is 1.2 times as high as the signal reproduced by the prior art VTR head arrangement shown in FIGS. 1(a) and 1(b). The operating frequency of a reproduced video signal processing circuit 12 of this embodiment is 1.2 times as high as that of the VTR head arrangement shown in FIGS. 1(a) and 1(b).

The reproduced video signal processing circuit 12 outputs a reproduced video signal obtained by mixing a reproduced luminance signal and a reproduced chrominance signal. The reproduced luminance signal is obtained by frequency-demodulating a freqeucny-modulated luminance signal included in the signal output from the switch 11. The reproduced chrominance signal is obtained by frequency-converting back to its original band a chrominance signal which is also included in the signal output from the switch 11 in a state of having been converted to a low band. A synchronizing (hereinafter referred to as sync) signal separation circuit 16 separates a sync signal included in the reproduced video signal and supplies the separated sync signal to the servo circuit 17. The sync signal thus obtained is used as a reference signal for the above-stated control over the drum motor 43 and the capstan motor 42.

Further, to ensure that the tracks are accurately traced by the heads Ha and Hb, the servo circuit 17 is arranged to control the capstan motor 42 in such a way as to make the output of the switch 11 have a maximum amplitude. Since this tracking control operation is well known and is not related directly to the present invention, the details of it are omitted from description.

The above-stated reproduced video signal can be output also from a terminal 15c. However, this reproduced video signal is a signal obtained by time-base-compressing the signal of each field to 5/6 of it as mentioned above. In supplying the reproduced video signal to an external device such as a monitor, therefore, the signal of each field is time-base-expanded to 6/5 of it by means of a time-base expansion circuit 13 before the reproduced video signal is output from a terminal 14.

As regards the audio signal, it is not related directly to this invention and is, therefore, the description of it is excluded from the present specification.

Next, the normal recording operation of the recording-side VTR R shown in FIG. 4 is described as follows: The recording-sid VTR is assumed to be a camera-integrated type VTR and is provided with the special video camera (over-scanning video camera) 31. The head arrangement of the recording-side VTR is the same as that of the reproducing-side VTR. The heads of the recording-side VTR are indicated as Ha' and Hb' for distinction from those of the reproducing-side VTR. The above-stated camera 31 is arranged to produce a video signal as shown in FIG. 6(b). The video signal is supplied to one terminal B of a switch 22. An external input terminal 32 is arranged to receive a video signal which is continuous as shown in FIG. 6(a). A time-base compression circuit 33 time-base-compresses this video signal to 5/6 for every field to make it into a signal which is shown in FIG. 6(b). The signal thus obtained by the circuit 33 is supplied to one terminal C of the switch 22. Further, a terminal 21c is arranged to receive a video signal which is also as shown in FIG. 6(b). The video signal received at the terminal 21c is supplied as it is to a terminal A of the switch 22.

With a normal recording mode selected at an operation part 36, when an instruction is given as to which of the input signals is to be recorded, the switch 22 supplies the input signal selected to a recording video signal processing circuit 23 and a sync signal separation circuit 24. A servo circuit 26 controls a capstan motor 44 by using information supplied from a system controller 37 according to the operation of the operation part 36 and a sync signal separated by the sync signal separation circuit 24. A capstan C' is thus caused to move a tape 41 at a rate of one track per field period. The servo circuit 26 also controls a drum motor 45 in such a way as to cause a drum D' to make one turn per field period.

The recording video signal processing circuit 23 frequency-modulates a luminance signal and converts the subcarrier frequency of a chrominance signal to a lower band to obtain a signal which is shown in FIG. 7(b). The signal thus obtained is supplied to a switch 25. The connecting position of the switch 25 alternately changes for every field period from on the side of a delay circuit 19 over to a head Hb' and vice versa. As a result of this, signals supplied to the heads Ha' and Hb' become as shown in FIGS. 6(c) and 6(d). The heads Ha' and Hb' are positioned to deviate from each other as much as one track pitch in the direction of the axis of rotation. The head Ha' thus traces the tape 41 a little ahead of the head Hb'. This allows the heads Ha' and Hb' to simultaneously form two tracks once per two filed periods. As a result, recording is performed in the same manner as the head arrangements of the prior art VTRs shown in FIGS. 1(a), 1(b), 2(a) and 2(b).

The signal output from the switch 22 is supplied to a special (over-scanning) monitor 49, which is arranged to scan from the upper end to the lower end of a monitor picture plane within 5/6 field period in the cycle of one-field period and has 5/6 of a normal horizontal scanning frequency. The recording state is thus monitored by the monitor 49. In the case of a camera-integrated VTR, this monitor 49 is used as a so-called electronic viewfinder. Further, to permit monitoring with an external monitor, there is provided a time-base expansion circuit 20 which is arranged to time-base-expand the signal of each field to 6/5. The output of the time-base expansion circuit 20 is supplied to a terminal 27 as a normal video signal which is shown in FIG. 6(a).

A dubbing operation with the above-stated reproducing-side and recording-side VTRs is described as follows:

The output terminals 15a and 15b of the reproducing-side VTR are connected to the input terminals 21a and 21b of the recording-side VTR. After that, when a dubbing mode is designated by the operation part 34 of the reproducing-side VTR and the operation part 36 of the recording-side VTR, the servo circuits 17 and 26 control the capstan motors 42 and 44 to cause the tapes 40 and 41 to be moved by the capstans C and C' at a rate of two tracks per one field period. The servo circuits 17 and 26 also control the drum motors 44 and 45 to cause the drums D and D' to make one turn per one field period.

This causes each of the reproducing heads Ha and Hb to trace every other track formed on the tape 40. With the servo circuit 17 arranged as mentioned above to carry out tracking control in such a way as to obtain the maximum output of the switch 11, the reproducing heads Ha and Hb trace only the tracks Ta and Tb respectively.

Figure 8:
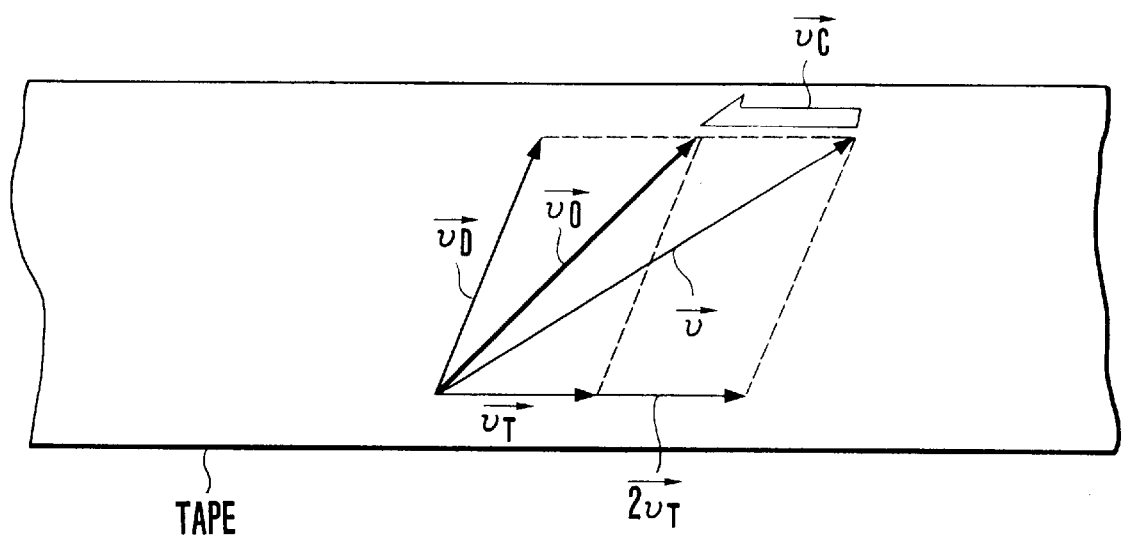
FIG. 8 shows the loci of head traces obtained by the VTR of the system of FIG. 4 during normal recording or reproduction and during dubbing.

However, since the tape transport speed in this case differs from the speed for normal reproduction, the heads Ha and Hb may not trace the tape in parallel to the tracks as shown in FIG. 8. Referring to FIG. 8, a reference symbol $\vec{v}T$ denotes a vector corresponding to the travel of the tape 40 during normal reproduction. A symbol $\vec{v}D$ denotes a vector corresponding to the rotation of the reproducing heads Ha and Hb. A symbol $\vec{v}O$ denotes a composite vector obtained from these vectors. In the case of dubbing, the vector corresponding to the travel of the tape 40 becomes $2\vec{v}T$ and the composite vector $\vec{v}$. In order to make this vector $\vec{v}$ coincide with the vector $\vec{v}O$, this embodiment is arranged to give the movement corresponding to a vector $\vec{v}C$ by means of the electrostrictive element 61 which is composed of a bimorph cell. In other words, in the 5/6 field period during which the heads Ha and Hb are tracing the surface of the tape 40, the electrostrictive element 61 gradually shifts the heads Ha and Hb to the extent of one track in the direction of the axis of rotation. The shift is reset during the remaining 1/6 field period. This action is repeated for every field and is caused by the servo circuit 17. This enables the heads Ha and Hb to trace the tape in parallel to the tracks, so that the tracks Ta and Tb can be accurately traced under the tracking control.

In FIG. 5(b), a reference numeral 61 denotes the bimorph cell. A numeral 62 denotes terminals to which a control signal is given from the servo circuit 17. A numeral 63 denotes a sensor such as a strain gage or the like. This sensor 63 is capable of detecting the absolute positions of the heads Ha and Hb in the direction of the axis of rotation and is provided for the purpose of accurately determining the positions of these heads for normal recording and reproduction. The output of the sensor 63 is arranged to be fed back to the servo circuit 17.

FIGS. 6(e) and 6(f) show the reproduced signals obtained by the heads Ha and Hb during dubbing. These signals are supplied to the output terminals 15a and 15b through reproduction amplifiers 46a and 46b respectively.

The recording-side VTR receives the signals which are shown in FIGS. 6(e) and 6(f) from the reproducing-side VTR through terminals 21a and 21b. These signals are supplied to the heads Ha' and Hb' through recording amplifiers 47a and 47b. Meanwhile, the heads Ha' and Hb' are displaced by an electrostrictive element 61', in the same manner as the heads Ha and Hb of the reproducing-side VTR, under the control of the servo circuit 26.

This enables the heads Ha' and Hb' to trace the surface of the tape 41 in the same direction as in normal recording. As a result, a 2-field amount of video signal is recorded simultaneously in adjacent tracks of different azimuth angles. This action is performed for every field period. The above-stated arrangement enables the dubbing system to carry out dubbing at a speed two times as fast as the speed of normal recording and reproduction.

The dubbing system of the embodiment described is capable of carrying out twice as fast as normal recording and reproducing operations by using VTRs of a small drum diameter, without increasing the number of heads and by simply adding the dubbing terminals and amplifiers.

Besides, the provision of the bimorph cell permits the embodiment to be used also as a VTR for normal recording and reproduction, so that the system can be efficiently used. Further, in the embodiment described above, the number of adjacently rotating heads is two. However, the number of heads may be increased to N (N: an integer which is at least 2) according to a desired dubbing speed. However, in cases where azimuth recording is required by a format and dubbing is to be performed with head arrangement made like in the case of this embodiment, the number of heads must be an even number.

While the dubbing system described is arranged on the assumption of the use of the VTRs having small drums, the same advantageous effect is likewise attainable by applying this invention to rotary head type information recording and reproducing apparatuses such as a DAT (digital audio tape recorder), etc. The arrangement of the embodiment described can be changed as desired within the scope of the invention as defined in the appended claims.

Figure 9:
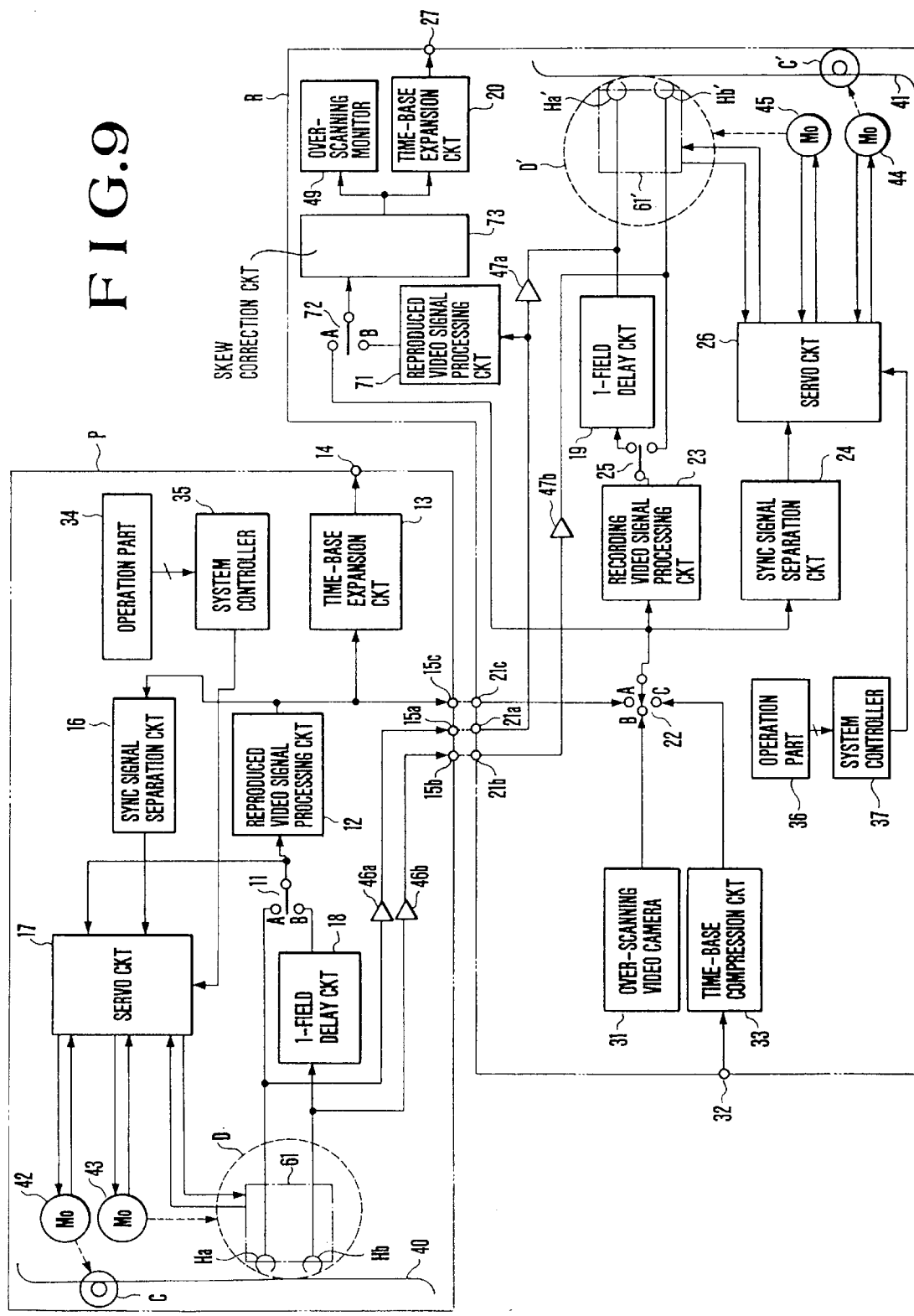
FIG. 9 is a block diagram showing in outline the arrangement of a dubbing system as another embodiment of the invention.

FIG. 9 shows in outline the arrangement of a dubbing system which is arranged as another embodiment of this invention. In FIG. 9, the same component parts as those of FIG. 4 are indicated by the same reference numerals and the details of them are omitted from description.

The embodiment shown in FIG. 9 differs from the system of FIG. 4 in the following points: The time-base expansion circuit 13 and the output terminal 14 are not included in the reproducing-side VTR. On the side of the recording-side VTR, the time-base compression circuit 33, the time-base expansion circuit 20, the input terminal 32 and the output terminal 27 are omitted.

Although this difference does not allow the embodiment to perform normal recording and normal reproduction, it permits reduction in the scale of circuit arrangement of the system as a whole with the dubbing system arranged as a closed system.

Figure 10:
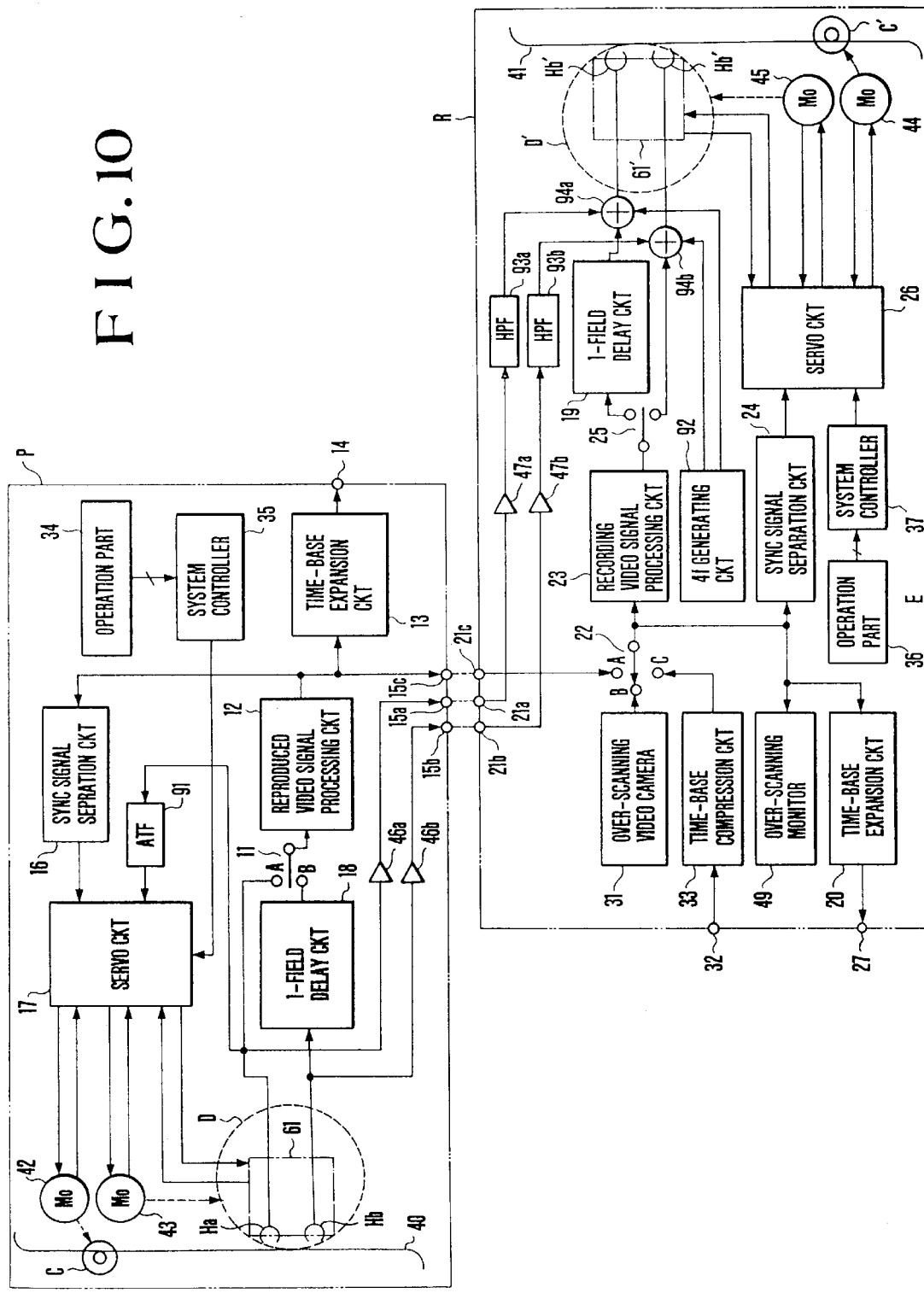
FIG. 10 is a block diagram showing in outline the arrangement of a dubbing system as a further embodiment of the invention.
Figure 11:
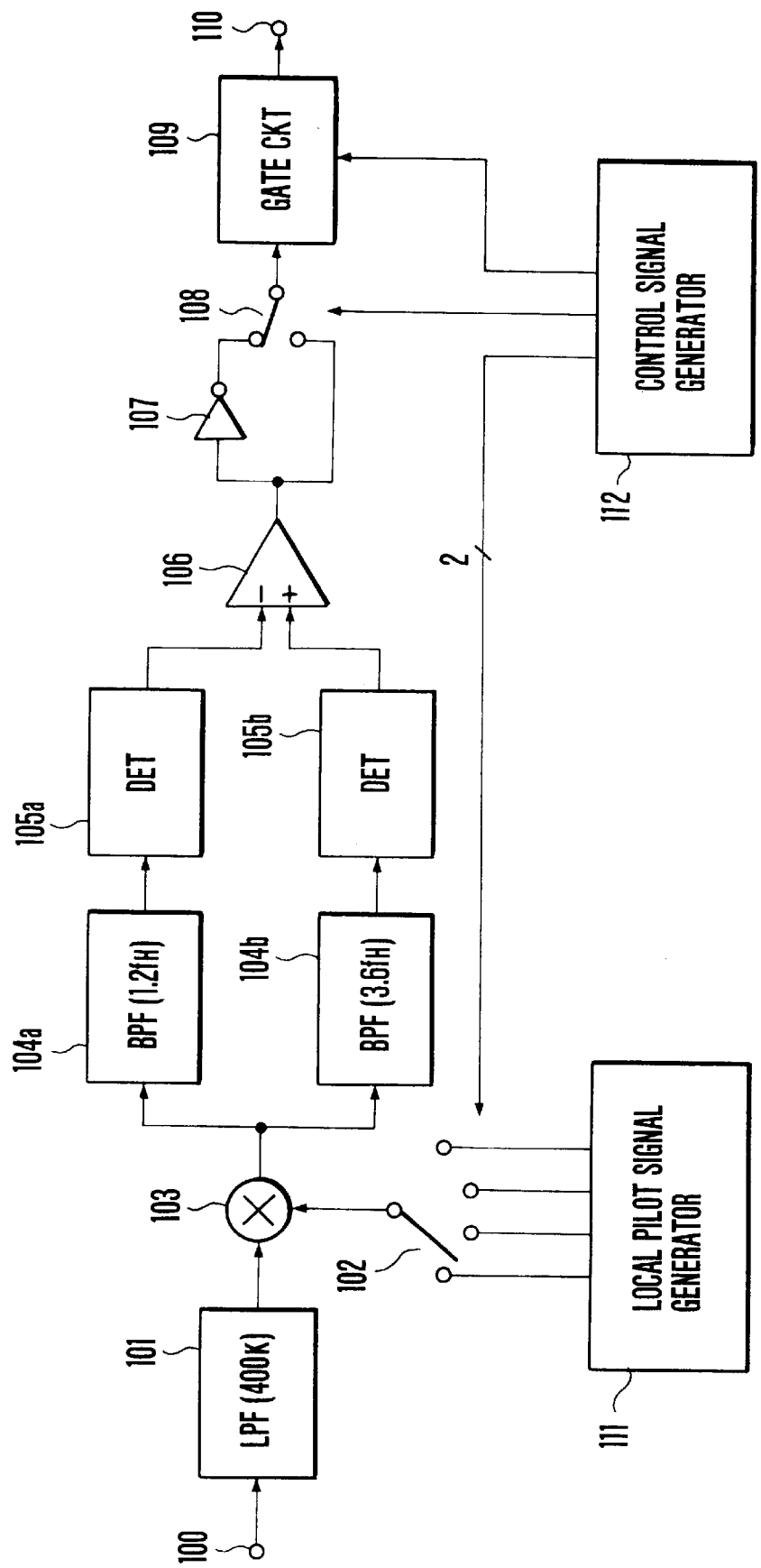
FIG. 11 is a circuit diagram showing by way of example the details of an ATF circuit included in FIG. 10.

FIG. 10 shows another dubbing system which is arranged as a further embodiment of the invention. The same component parts as those shown in FIG. 4 are indicated by the same reference numerals and the details of them are omitted from description. FIG. 11 shows by way of example the details of arrangement of a tracking control signal generating circuit (hereinafter referred to as an ATF circuit) included in the system of FIG. 10. FIGS. 12(a) to 12(i) show in a timing chart the waveforms of signals obtained at various parts of FIG. 10.

Figure 13:
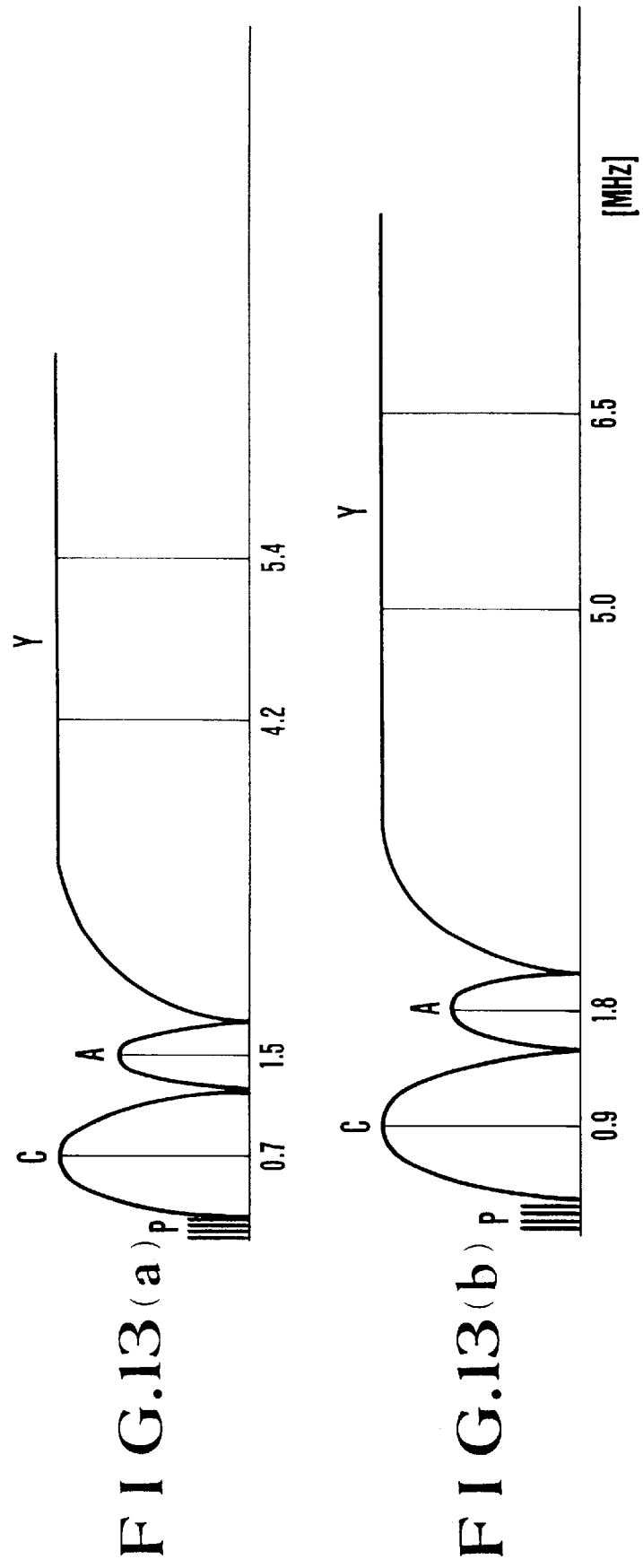
FIGS. 13(a) and 13(b) show video signals to be handled by the system of FIG. 10.

FIGS. 13(a) and 13(b) show the spectrum allocation of signals recorded and reproduced by VTRs included in the system of FIG. 10. Pilot signals 4P which are provided in four different kinds for tracking control are added to what are shown in FIGS. 7(a) and 7(b). The reproducing-side VTR P of this embodiment performs the above-stated tracking control in the following manner:

As shown in FIG. 10, the ATF circuit 91 receives only the reproduced signal obtained by the head Ha. The reproduced signal comes to an input terminal 100 of the ATF circuit which is arranged as shown in FIG. 11. Referring to FIG. 11, the signal received at the terminal 100 is supplied to a low-pass filter (LPF) 101. The LPF 101 then separates only the pilot signals. In the case of this embodiment, the frequency of the reproduced signal is 1.2 times as high as an ordinary frequency. In this case, a pilot signal having the highest frequency among the four different pilot signals f1, f2, f3 and f4 which respectively have frequencies 1.2 times as high as those of ordinary pilot signals can be extracted. Hence, a frequency at which a chrominance signal can be cut is set at 400 Hz and the LPF 101 is thus arranged to have its cut-off frequency at 400 Hz.

The pilot signal separated by the LPF 101 is discussed as follows: The head Ha is arranged to serially trace tracks one by one and, as mentioned in the foregoing, the track Ta having an azimuth angle corresponding to the head Ha and the track Tb having an azimuth angle corresponding to the head Hb are alternately traced. Since the pilot signal frequency is sufficiently low, it remains unaffected by the azimuth angle. In other words, with the tracking control normally performed, the pilot signal mainly reproduced by the head Ha serially changes from one pilot signal over to another for every field period, for example, in the sequence of f1-f2-f3-f4.

In the normal reproduction, therefore, four different local pilot signals f1, f2, f3 and f4 which are output from a local pilot signal generator 111 are selectively output through a switch 102 for every field in the sequence of f1-f2-f3-f4 and applied to a multiplier 103 to which the output of the LPF 101 is also applied. The output of this multiplier 103 is supplied to band-pass filters (BPFs) 104a and 104b which are arranged to separate frequency components corresponding to frequency differences between the pilot signals of two adjacent tracks in a well known manner. Generally, in the case of the conventional VTR having the head arrangement as shown in FIGS. 1(a) and 1(b), the frequency differences between the pilot signals of two adjacent tracks are arranged to be fH (fH: a horizontal scanning frequency) and 3 fH. According to this, the pass-bands of the BPFs 104a and 104b of the embodiment become 1.2 fH and 3.6 fH.

The output signals of these BPFs 104a and 104b are supplied to amplitude detection circuits 105a and 105b to detect crosstalks from two adjacent tracks located on both sides of each controlled track respectively. The outputs of these detection circuits 105a and 105b are supplied to a difference circuit 106 to obtain a signal indicating the degree of tracking deviation. As well known, the frequency component separated by each of the amplitude detection circuits 105a and 105b corresponds to a crosstalk component obtained from an adjacent track which is changing for every field to another adjacent track located on the opposite side of the controlled track. In view of this, there is provided a combination of an inverting circuit 107 and a switch 108 which is changed over for every field, for obtaining a signal which indicates the tracking deviation degree and the direction in which the deviation is taking place.

A gate circuit 109 is arranged to perform a gating action only for the effective period of the signal output from the switch 108, that is, only for a period during which the head Ha is tracing the surface of the tape 40 and to produce a tracking error detection signal (hereinafter referred to as an ATF signal). The ATF signal is supplied to the servo circuit 17 via a terminal 110.

Further, the gate timing of this gate circuit 109 and the switch timing of the switches 102 and 108 are controlled by a control signal generating circuit 112 in accordance with a rotation detection signal obtained from a detector which is not shown but is arranged to detect the rotation of the drum D.

The servo circuit 17 is arranged to control a capstan motor 42 according to the low-frequency component of the above-stated ATF signal to have a capstan C rotated in such a way that the heads Ha and Hb trace the center lines of the tracks Ta and Tb respectively. The servo circuit 17 further controls, according to the high-frequency component of the ATF signal, an electrostrictive element 61 which is composed of a bimorph cell in such a way as to cause the heads to follow the waving of the tracks as will be described later herein.

In the recording-side VTR, a 4f generating circuit 92 is arranged to generate pilot signals for tracking control. This circuit 92 is capable of simultaneously generating pilot signals of two channels. In normal recording, the pilot signals are generated for every other field period, that is, only for the fields for which the heads Ha' and Hb' record the video signal. Then, the circuit 92 alternatively supplies an adder 94a with pilot signals f1 and f3 and another adder 94b with the pilot signals f2 and f4.

Next, the dubbing operation of the system shown in FIG. 10 is described as follows: The flow of the video signal is the same as in the case of the system of FIG. 4 and is, therefore, omitted from description. For the dubbing operation, the tracking control is performed as follows: The reproduced signal obtained by the head Ha is alone supplied to the ATF circuit 91 in the same manner as in normal reproduction. As regards the pilot signals supplied to the LPF 101 of FIG. 11, the head Ha which traces only the track Ta reproduces mainly the pilot signal f1 or f3 for every filed period. Therefore, the ATF signal can be obtained from the ATF circuit 91 with the local pilot signals f1 and f3 alternately output for each of the field periods from the switch 102. In this instance, however, the frequency components separated by the amplitude detection circuits 105a and 105b are obtained always from the tracks adjoining the controlled tracks in one and the same direction. Therefore, the connecting position of the switch 108 remains unchanged. Meanwhile the gate circuit 109 operates in the same manner as in normal reproduction. The ATF signal thus obtained is supplied from the ATF circuit 91 to the servo circuit 17.

The servo circuit 17 operates in the same manner as in normal reproduction to control the capstan motor 42 according to the low-frequency component of the ATF signal and to control the electrostrictive elements 61 according to the high-frequency component of the ATF signal.

Figure 12:
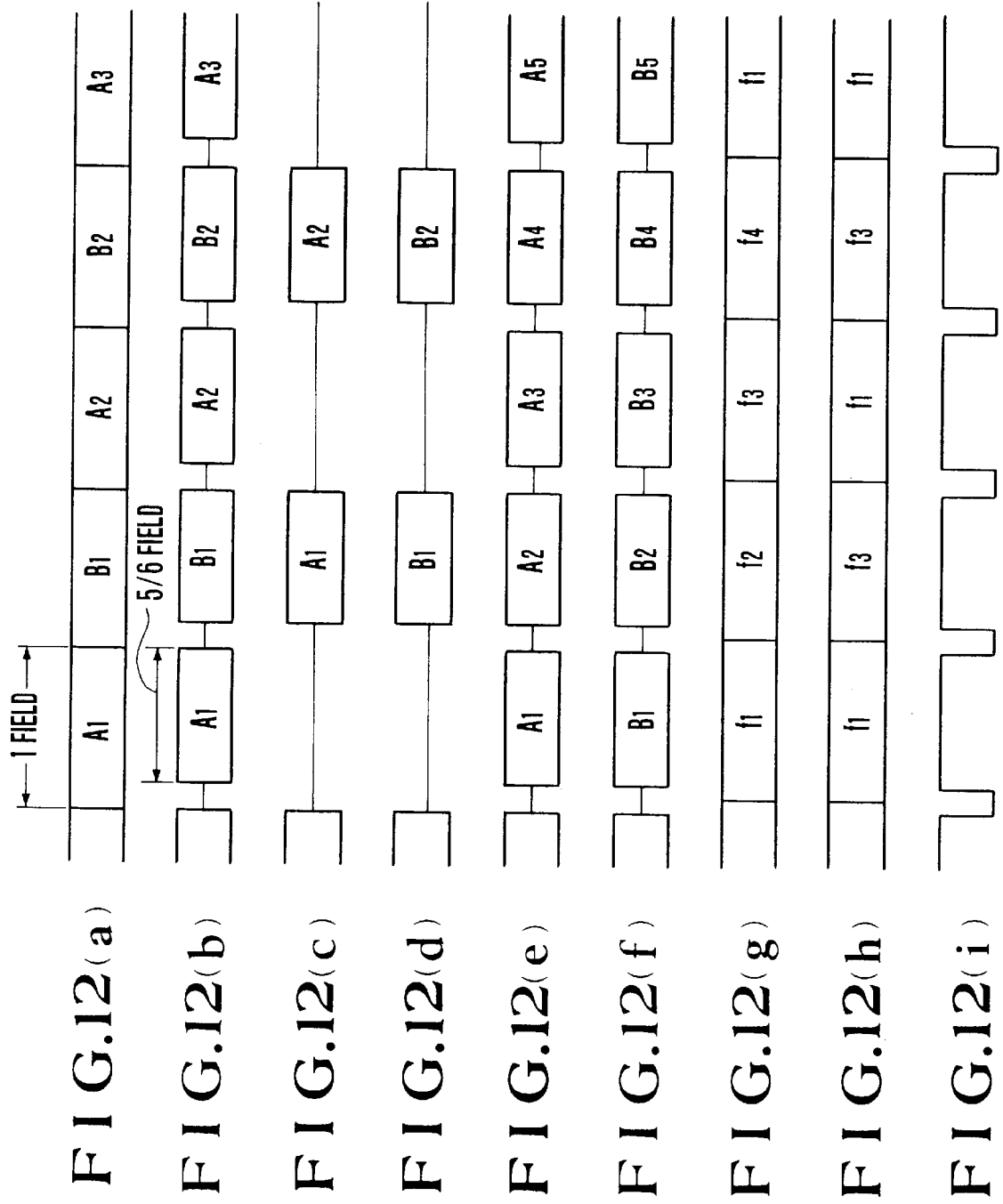
FIGS. 12(a) to 12(i) show in a timing chart the signal processing timing of each part of the system of FIG. 10.

The signals reproduced by the heads Ha and Hb during the dubbing operation are as shown in FIGS. 12(e) and 12(f). These signals are supplied via the reproduction amplifiers 46a and 46b to the output terminals 15a and 15b.

In the recording-side VTR, the signals which are output from the reproducing-side VTR as shown in FIGS. 12(e) and 12(f) are received at terminals 21a and 21b. The reproduced signals are then supplied via amplifiers 47a and 47b to high-pass filters (HPFs) 93a and 93b. The HPFs 93a and 93b remove the reproduced pilot signal components and output only video and audio signal components which are shown in FIG. 13(b). The output signals of the HPFs 93a and 93b are supplied to adders 94a and 94b. The adders 94a and 94b then add pilot signals generated by the 4f generating circuit 92 to these signals. During the dubbing operation, the 4f generating circuit 92 alternately supplies the adder 92a with the pilot signals f1 and f3 and the other adder 92b with the pilot signals f2 and f4 for every one-field period. The output signals of the adders 94a and 94b are supplied respectively to the heads Ha' and Hb'. The heads Ha' and Hb' are displaced by an electrostrictive element 61' in the same manner as the heads Ha and Hb arranged on the reproduction side. This head displacing action is performed under the control of a servo circuit 26.

This allows the heads Ha' and Hb' to trace the surface of a tape 41 in exactly the same direction as in normal recording. As a result, a two-field amount of the video signal and tracking control pilot signals are recorded simultaneously in adjacent tracks which have different azimuth angles. This action is repeated for every one-field period. In this manner, dubbing can be carried out at a speed which is twice as high as the speed of normal recording and reproduction.

Figure 14:
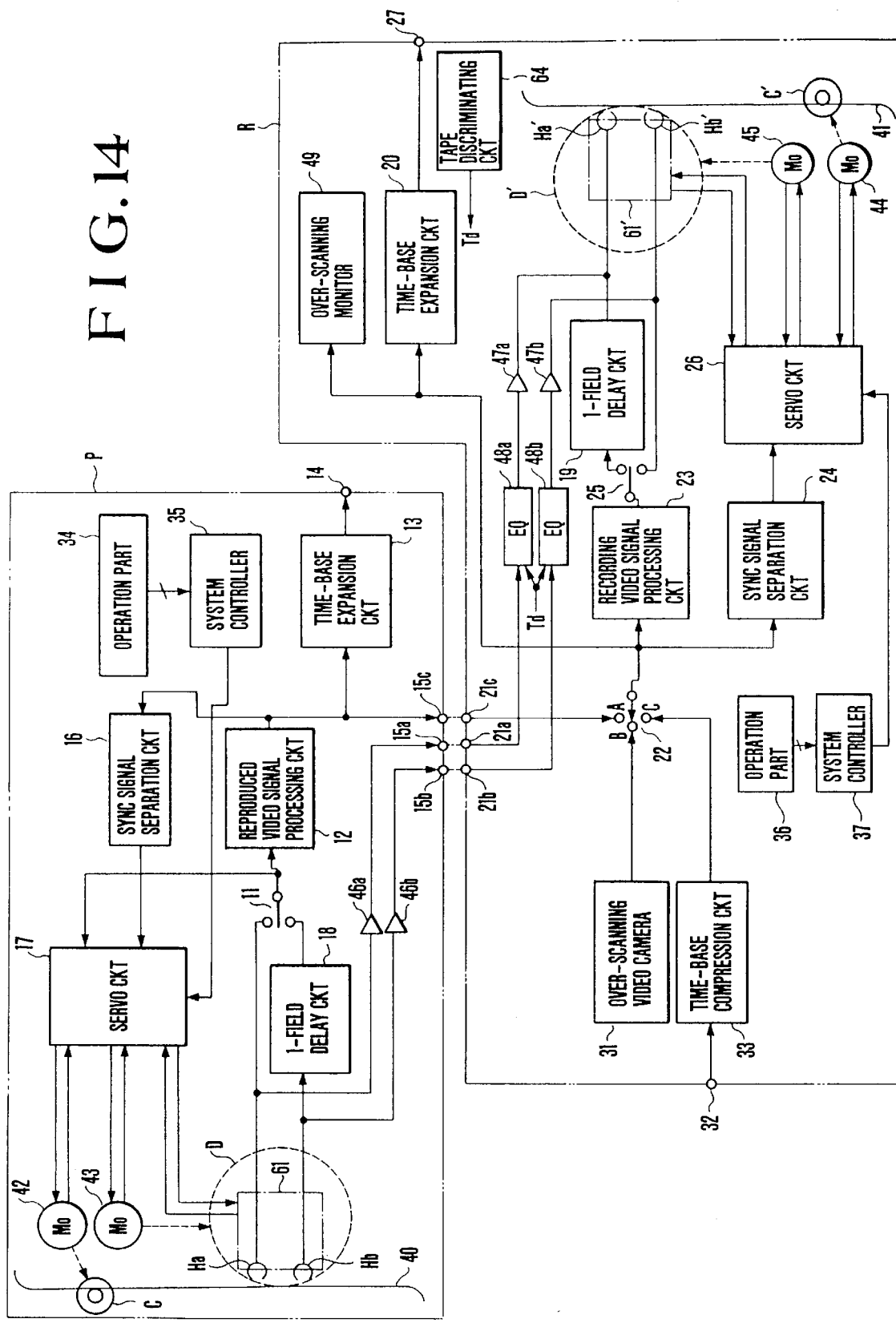
FIG. 14 is a block diagram showing in outline the arrangement of a dubbing system arranged as a still further embodiment of the invention.

FIG. 14 shows in outline the arrangement of a dubbing system which is arranged also according to this invention as a further embodiment thereof. In FIG. 14, the same component parts as those of FIG. 4 are indicated by the same reference numerals and the details of them are omitted from description.

The system shown in FIG. 14 differs from the system of FIG. 4 in the following point: In dubbing, the signals which are shown in FIGS. 6(e) and 6(f) are supplied in the state of RF signals from the reproducing-side VTR to the terminals 21a and 21b of the recording-side VTR. Then, on the side of the recording-side VTR, the input RF signals are supplied to equalizers 48a and 48b.

The equalizers 48a and 48b are provided for the purpose of causing the RF signal which has been time-base-compressed to 5/6 before they are supplied to the terminals 21a and 21b to be equalized in such a way as to have then recorded in the same manner as in normal recording. In addition to that, the equalizers 48a and 48b are arranged to correct any difference in characteristics between tapes 40 and 41, because these tapes do not always have the same characteristics.

Figure 15:
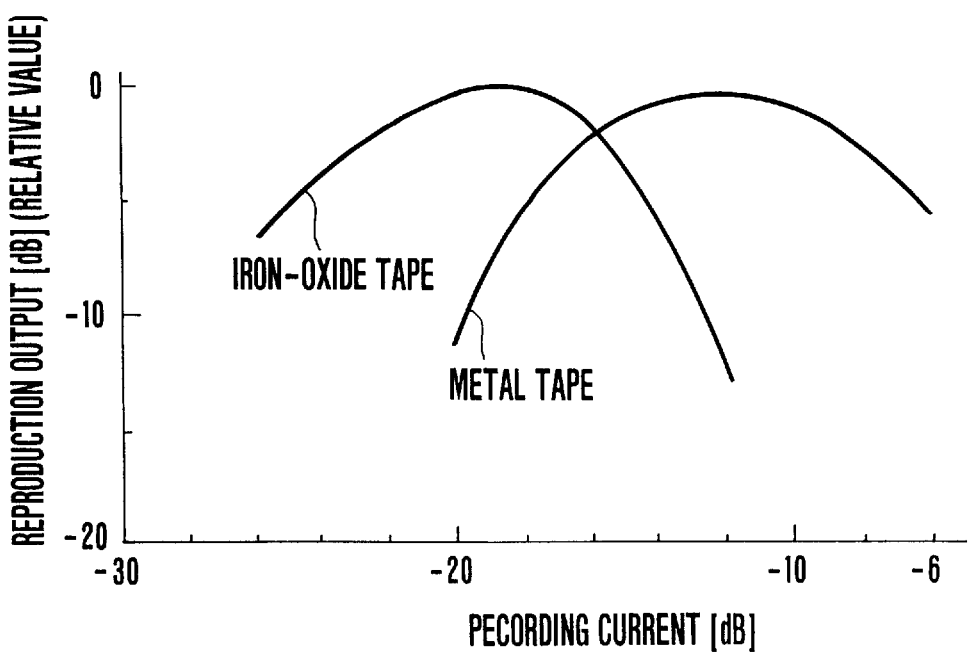
FIGS. 15 and 16 show differences in recording/reproducing characteristics resulting from the use of tapes of different kinds.
Figure 16:
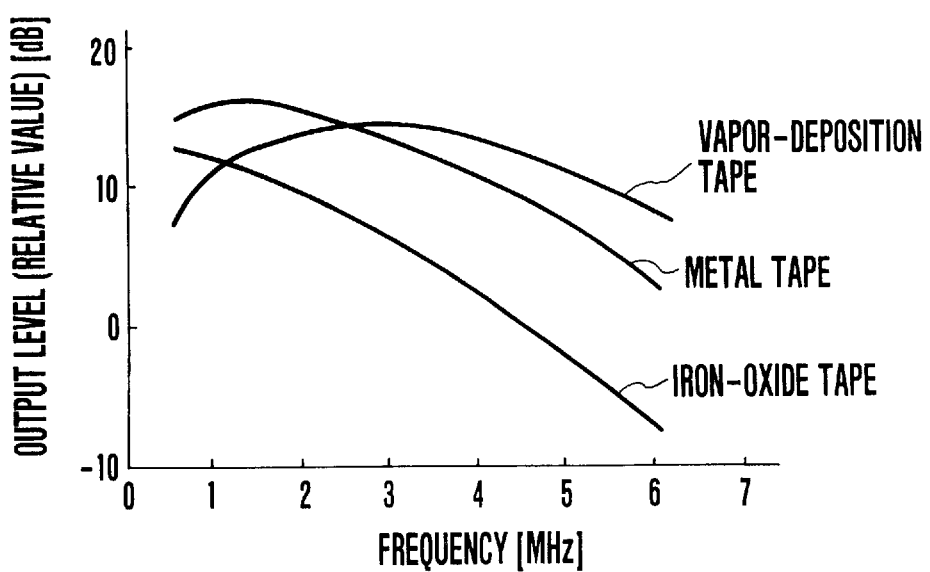

FIGS. 15 and 16 show differences in recording and reproduction characteristics between tapes of different kinds. FIG. 15 shows a difference between an iron-oxide tape and a metal tape in self-recording/reproduction characteristic as in relation to the value of a recording current. FIG. 16 shows differences among an iron-oxide tape, a metal tape and vapor-deposition tape in frequency characteristic obtained by self-recording/reproduction. In other words, the recording-side VTR R is provided with a tape discriminating circuit 64 for making a discrimination between tapes of different kinds by the shape of a tape cassette or the like in a known manner. The result of the discrimination is supplied as data Td to the equalizers 48a and 48b. In accordance with this data Td, the equalizers 48a and 48b operate to compensate for a difference in characteristic between a normal signal and the signal which has been time-base-compressed. In addition to that, the equalizers change the recording current value and the frequency characteristic to values suited for each tape.

The signals of N channels which are thus equalized by the equalizers 48a and 48b are supplied to the heads Ha' and Hb' via the recording amplifiers 47a and 47b. As mentioned in the foregoing, the heads Ha' and Hb' have been displaced by the electrostrictive element 61' in the same manner as the heads Ha and Hb disposed on the side of reproduction. The displacing action on the heads are controlled by the servo circuit 26.

In addition to the same advantageous effect as the dubbing system shown in FIG. 4, the arrangement to transfer signals through the equalizers enables the dubbing system of this embodiment to duplicate with fidelity the signals recorded on the master tape.

What is claimed is:

1. A video signal reproducing apparatus, comprising:
   (a) reproducing means for reproducing signals including time-base-compressed video signals from a tape-like shaped recording medium on which a number of tracks, having different azimuth angles between adjacent tracks, are formed, said reproducing means including rotary head means having N rotary heads (N: an integer which is not less than 2) which have different azimuth angles between adjacent heads and are disposed in a closely adjacent state, said rotary head means being operative to trace the tape-like shaped recording medium;
   (b) mode switching means for switching an operational mode of said video signal reproducing apparatus among a plurality of modes, said plurality of modes including a first mode in which said N rotary heads are used in parallel so as to reproduce the time-base-compressed video signals of N channels from adjacent N tracks on the tape-like shaped recording medium with a period which is of N times a predetermined period, and a second mode in which said N rotary heads are used in parallel so as to reproduce the time-based-compressed video signals of N channels from N adjacent tracks on the tape-like shaped recording medium with the predetermined period, wherein said second mode is used for copying the tape-like shaped recording medium;
   (c) control means for controlling a relative position between the N rotary heads and the tape-like shaped recording medium by using only a signal reproduced by one of the N rotary heads; and
   (d) output means for outputting the video signals of N channels reproduced by said reproducing means to a recording apparatus in the time-base-compressed state.

2. An apparatus according to claim 1, further comprising: transporting means for transporting said tape-like shaped recording medium.

3. An apparatus according to claim 2, wherein said control means includes extracting means for extracting a pilot signal component from the signal reproduced by said reproducing means, and performs a tracking control operation in accordance with an output of said extracting means.

4. An apparatus according to claim 1, wherein said recording apparatus receives the video signals reproduced in the first mode, and records the received video signals on N tracks of a tape-like shaped recording medium by using N rotary heads in parallel with a period which is of N times said predetermined period.

5. An apparatus according to claim 1, wherein said recording apparatus receives the video signals reproduced in the second mode, and records the received video signals on N tracks of a tape-like shaped recording medium by using N rotary heads in parallel with said predetermined period.

6. An apparatus according to claim 1, wherein the rotation periods of the N rotary heads in the first mode are equal to those of the N rotary heads in the second mode.

7. An apparatus according to claim 1, wherein said rotary head means (reproduction) has a member to which the N rotary heads are commonly attached, and a rotary cylinder, and the N rotary heads are provided on the rotary cylinder through said member.

8. An apparatus according to claim 1, further comprising expanding means for expanding the time axis of the time-base-compressed video signals reproduced by the reproducing means and outputting the expanded video signals to a peripheral device.

9. A video signal reproducing apparatus, comprising:
   (a) reproducing means for reproducing signals including time-base-compressed video signals from a tape-like shaped recording medium on which a number of tracks, having different azimuth angles between adjacent tracks, are formed, said reproducing means including rotary head means having N rotary heads (N: an integer which is not less than 2) which have different azimuth angles between adjacent heads and are disposed in a closely adjacent state;
   (b) transporting means for transporting the tape-like shaped recording medium, wherein said video signal reproducing apparatus has a first mode in which said transporting means transports the tape-like shaped recording medium at a predetermined speed, and said reproducing means reproduces the time-base-compressed video signals of N channels in parallel from N adjacent tracks on the tape-like shaped recording medium by using said N rotary heads, and a second mode in which said transporting means transports the tape-like shaped recording medium at a speed which is of N times the predetermined speed, and said reproducing means reproduces the time-base-compressed video signals of N channels in parallel from N adjacent tracks on the tape-like shaped recording medium by using said N rotary heads, wherein said second mode is used for copying the tape-like shaped recording medium;

(c) control means for controlling a relative position between the N rotary heads and the tape-like shaped recording medium by using only a signal reproduced by one of the N rotary heads; and (d) output means for outputting the video signals of N channels reproduced by said reproducing means to a recording apparatus in the time-base-compressed state.

10. An apparatus according to claim 9, wherein said control means includes extracting means for extracting a pilot signal component from the signal reproduced by said reproducing means, and performs a tracking control operation in accordance with an output of said extracting means.

11. An apparatus according to claim 9, wherein said recording apparatus receive the video signals reproduced in the first mode, and records the received video signals on N tracks of a tape-like shaped recording medium, which is transported at said predetermined speed, by using N rotary heads in parallel.

12. An apparatus according to claim 9, wherein said recording apparatus receives the video signals reproduced in the second mode, and records the received video signals on N tracks of a tape-like shaped recording medium, which is transported at a speed which is of N times said predetermined speed, by using N rotary heads in parallel.

13. An apparatus according to claim 9, wherein the rotation periods of the N rotary heads in the first mode are equal to those of the N rotary heads in the second mode.

14. An apparatus according to claim 9, wherein rotary head means (reproduction) has a member to which the N rotary heads are commonly attached, and a rotary cylinder, and the N rotary heads are provided on the rotary cylinder through said member.

15. An apparatus according to claim 9, further comprising expanding means for expanding the time axis of the time-base-compressed video signals reproduced by the reproducing means and outputting the expanded video signals to a peripheral device.

16. A video signal reproducing apparatus, comprising:

(a) reproducing means for reproducing signals including time-base-compressed video signals from a tape-like shaped recording medium on which a number of tracks, having different azimuth angles between adjacent tracks, are formed, said reproducing means including rotary head means having N rotary heads (N: an integer which is not less than 2) which have different azimuth angles between adjacent heads and are disposed in a closely adjacent state;

(b) mode switching means for switching an operational mode of said reproducing means among a plurality of modes, said plurality of modes including a first mode in which said N rotary heads are used to reproduce the time-base-compressed video signals of N channel in parallel from N adjacent tracks on said tape-like shaped recording medium, and a second mode in which said N rotary heads are used to reproduce the time-base-compressed video signals of N channels in parallel, which have an information amount of N times the time-base-compressed video signals reproduced in the first mode for a predetermined period of time, from N adjacent tracks on said tape-like shaped recording medium, wherein said second mode is used for copying said tape-like shaped recording medium;

(c) control means for controlling a relative position between the N rotary heads and the tape-like shaped recording medium by using only a signal reproduced by one of the N rotary heads; and (d) output means for outputting the video signals of N channels reproduced by said reproducing means to a recording apparatus in the time-base-compressed state.

17. An apparatus according to claim 16, further comprising:

transporting means for transporting said tape-like shaped recording medium, wherein said transporting means transports said tape-like shaped recording medium at a predetermined speed in the first mode, and at a speed which is N times said predetermined speed, in the second mode.

18. An apparatus according to claim 16, wherein the rotation periods of the N rotary heads in the first mode are equal to those of the N rotary heads in the second mode.

19. An apparatus according to claim 16, wherein rotary head means (reproduction) has a member to which the N rotary heads are commonly attached, and a rotary cylinder, and the N rotary heads are provided on the rotary cylinder through said member.

20. An apparatus according to claim 16, further comprising expanding means for expanding the time axis of the time-base-compressed video signals reproduced by the reproducing means and outputting the expanded video signals to a peripheral device.

21. A video signal reproducing apparatus, comprising:

(a) transporting means for transporting a tape-like shaped recording medium on which a number of tracks, having different azimuth angles between adjacent tracks, are formed, and on which signals including time-base-compressed video signals of a predetermined period of time are recorded;

(b) reproducing means for reproducing the time-base-compressed video signals from the tape-like shaped recording medium, said reproducing means including N rotary head means having N rotary heads (N: an integer which is not less than 2) and are disposed in a closely adjacent state, said reproducing means reproducing the time-base-compressed video signals of N channels from adjacent N tracks on the tape-like shaped recording medium by using said N rotary heads in parallel;

(c) tracking control means for controlling a relative position between the N rotary heads and the tape-like shaped recording medium by using only a signal reproduced by one of the N rotary heads; and (d) output means for outputting the video signals reproduced by said reproducing means in a time-base-compressed state to a recording apparatus, said recording apparatus receiving the video signals in the time-base-compressed state output from said output means.

22. An apparatus according to claim 21, wherein said reproducing means reproduces, by using said N rotary heads in parallel, the time-base-compressed video signals recorded in said N adjacent tracks by taking a period of time shorter than the predetermined period of time.

23. An apparatus according to claim 21, further comprising expanding means for expanding the time axis of the time-base-compressed video signals reproduced by said reproducing means and outputting the expanded video signals to a peripheral device.

24. An apparatus according to claim 21, wherein said tracking control means comprises extraction means for extracting a pilot signal component in said video signals reproduced by said reproducing means and controlling the relative position between said N rotary heads and the tape-like-shaped recording medium by using the extracted pilot signal component.

25. An apparatus according to claim 21, wherein said output means outputs the video signals to the recording apparatus for copying the video signals.

* * * * *

UNITED STATES PATENT AND TRADEMARK OFFICE
CERTIFICATE OF CORRECTION

PATENT NO. : 5,878,185
DATED : March 2, 1999
INVENTOR(S) : Koji Takahashi

It is certified that error appears in the above-identified patent and that said Letters Patent is hereby corrected as shown below:

Col. 1, line 37, after "As" insert -- is --.
Col. 2, line 61, delete "are" and insert -- is --.
Col. 4, line 16, delete "follows:" and insert -- follows. --.
Col. 4, line 45, delete "1-filed" and insert -- one-field --.
Col. 5, line 42, delete "follows:" and insert -- follows. --.
Col. 5, line 43, delete "recording-sid" and insert -- recording-side --.
Col. 6, line 21, delete "filed" and insert -- field --.
Col. 7, line 48, delete "capable of carrying out twice as fast as " and insert -- capable of twice as fast a performance as --.
Col. 8, line 10, delete "points:" and insert -- points. --.

Signed and Sealed this

Eighth Day of February, 2000

Attest:

Q. TODD DICKINSON

Attesting Officer

Commissioner of Patents and Trademarks